Figure 1:
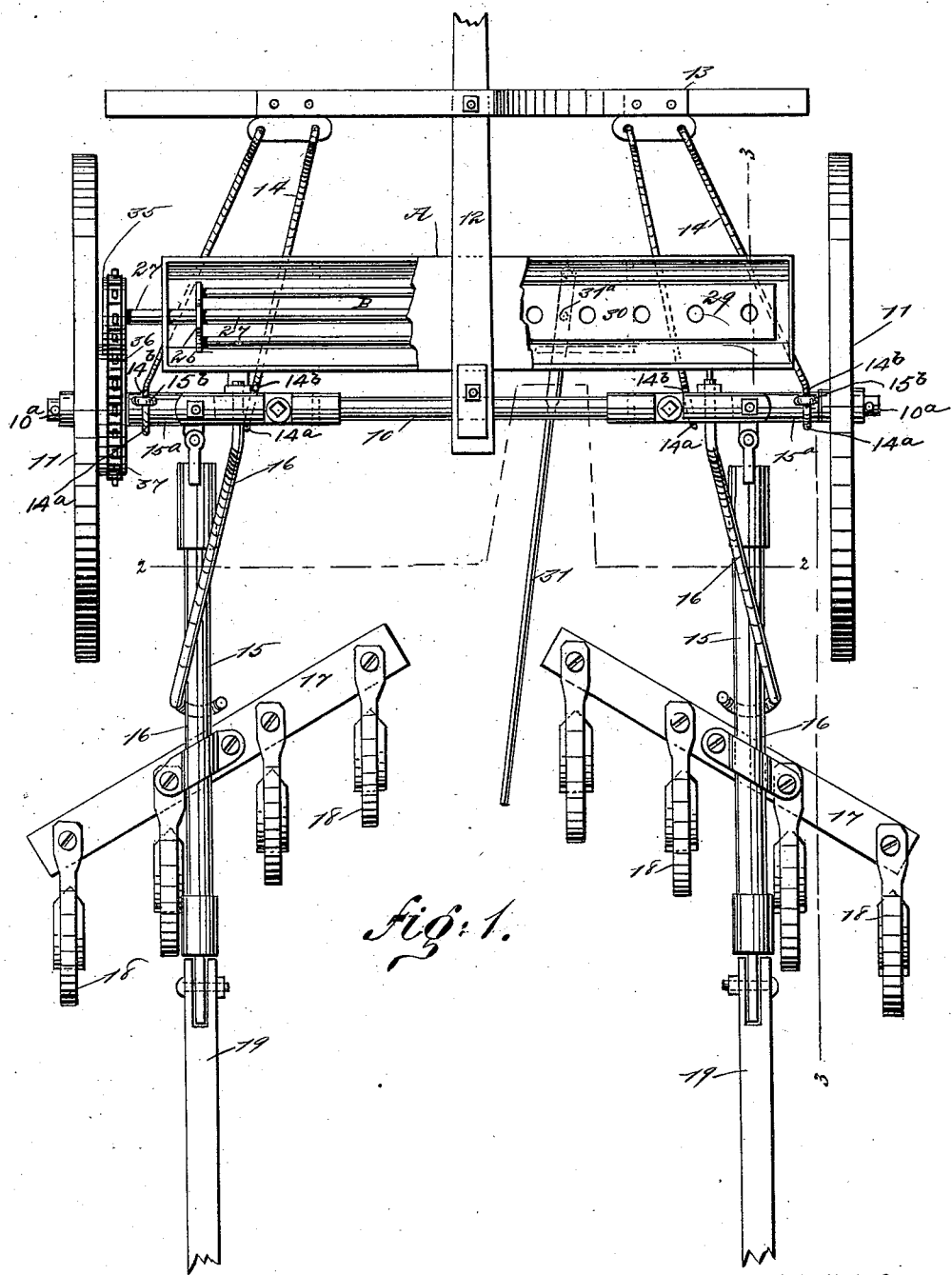

(No Model.) 2 Sheets—Sheet 2.
W. R. FROST & W. H. BUTLIN.
SEEDER ATTACHMENT FOR CULTIVATORS.
No. 556,263. Patented Mar. 10, 1896.
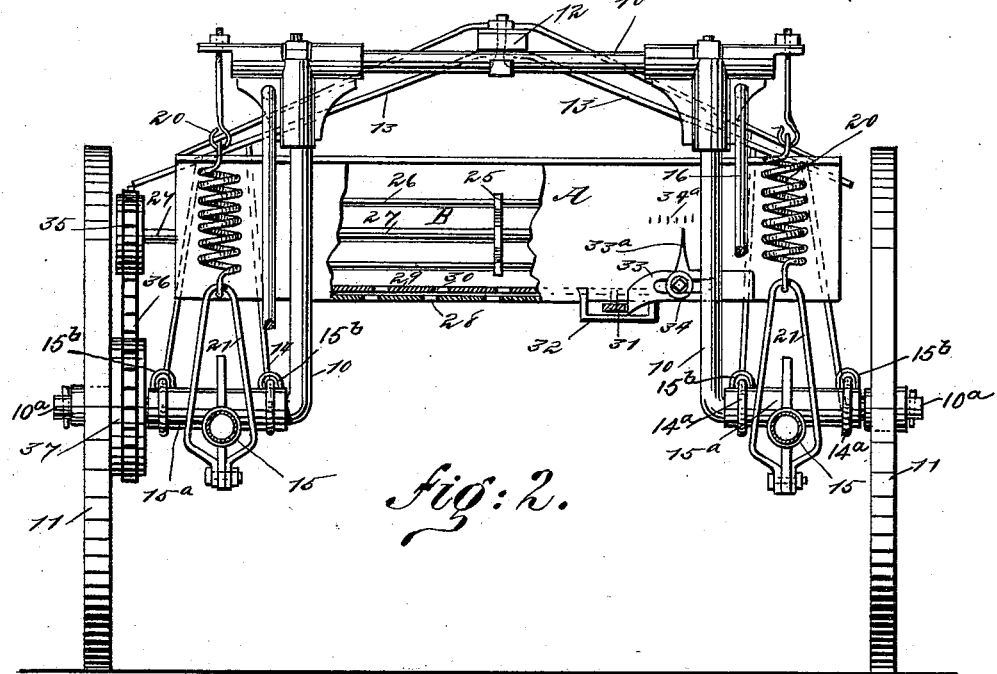
Fig: 2.
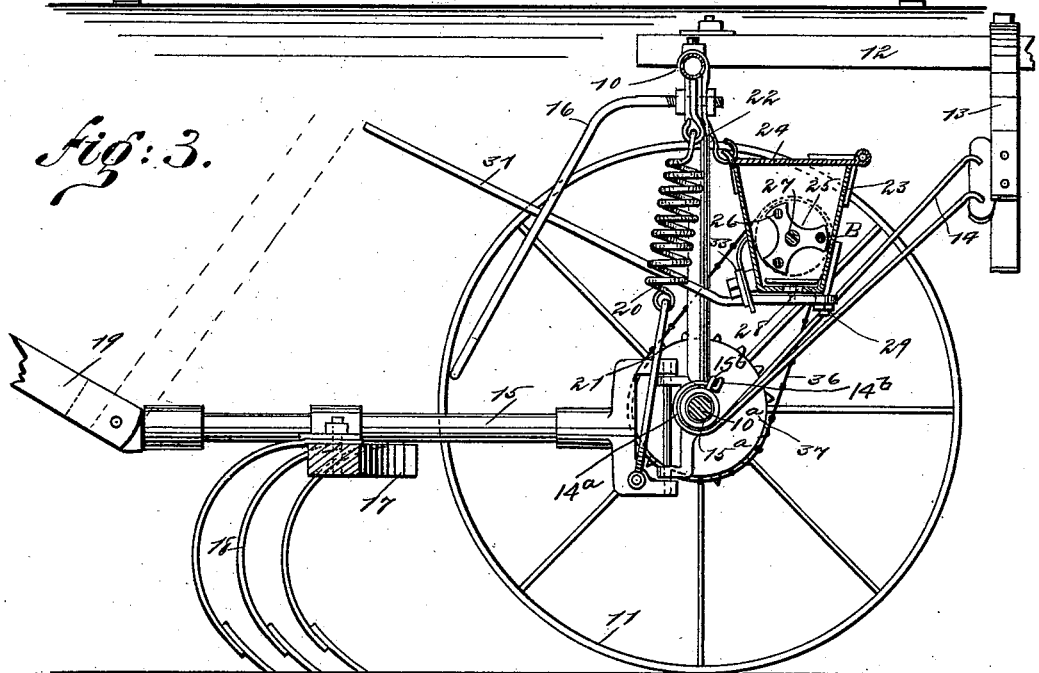
Fig: 3.
WITNESSES:
Chas. Nida.
Fred Acker.
INVENTORS
W. R. Frost
W. H. Butlin
BY Munn & Co.
ATTORNEYS.

UNITED STATES PATENT OFFICE.

WILLIAM R. FROST AND WILLIAM H. BUTLIN, OF CROTON, IOWA.

SEEDER ATTACHMENT FOR CULTIVATORS.

SPECIFICATION forming part of Letters Patent No. 556,263, dated March 10, 1896.

Application filed September 4, 1895. Serial No. 561,470. (No model.)

*To all whom it may concern:*

Be it known that we, WILLIAM RANDOLPH FROST and WILLIAM HALLECK BUTLIN, of Croton, in the county of Lee and State of Iowa, have invented a new and Improved Seeder Attachment for Cultivators, of which the following is a full, clear, and exact description.

Our invention relates to a seeder attachment for cultivators, and particularly to an attachment for cultivators having spring-teeth; and the object of the invention is to provide a seeder attachment for a cultivator adapted particularly for sowing oats in corn-ground or wheat in corn-stubble, or for kindred purposes, the attachment being used as readily on rough ground or on a hillside as upon smooth ground; and a further object of the invention is to provide a seeder attachment which will be exceedingly simple, durable and economic in its construction, and which may be expeditiously and conveniently applied to or removed from a cultivator.

Another object of the invention is to provide a simple means for controlling the amount of seed to be dropped per acre, for example, and to provide means whereby when the adjustment of the shifting-lever has once been made the lever may be always carried back to the said adjusted position without any especial attention being paid to the movement of the lever on the part of the operator.

The invention consists in the novel construction and combination of the several parts, as will be hereinafter fully set forth and pointed out in the claim.

Reference is to be had to the accompanying drawings, forming a part of this specification, in which similar characters of reference indicate corresponding parts in all the figures.

Figure 1 is a plan view of the cultivator having the attachment applied thereto, a portion of the cover of the hopper or grain-box being broken away. Fig. 2 is a section through the cultivator, taken practically on the line 2 2 in Fig. 1, a part of the front of the hopper or grain-box being in vertical section; and Fig. 3 is a section taken substantially on the line 3 3 of Fig. 1.

The cultivator illustrated in the drawings is of the two-horse type, and the especial object of this invention is to provide a seeder attachment for this class of machines. We are aware that there have been seeder attachments for one-horse cultivators and for disk harrows, wagons, and the like.

In the construction of the cultivator an arched axle 10 is employed, on which the ground-wheels 11 are mounted. The pole 12 is secured to the central upper portion of the arch and is provided with an arched brace-bar 13, extending downward therefrom and connected by braces 14 with sleeves $15^a$, mounted upon the horizontal portions of the axle. The beams 15 of the cultivator have a hinged connection with the aforesaid sleeves $15^a$, and arms 16 are projected downwardly and rearwardly from the arched axle, terminating in hooks at their lower ends to receive the beams when the cultivator-blades are to be held out of engagement with the ground.

The cultivator blades or teeth 18 are spring-teeth, and are secured to head-beams 17 placed diagonally on the main or pivoted beams 15, the teeth-carrying beams being made to converge at their inner ends, and handles 19 are secured in any suitable or approved manner to the rear ends of the main beams.

As shown in the drawings, the braces 14 are carried down diagonally rearward and curved at their rear ends, as indicated at $14^a$, concentric with the sleeves $15^a$, which turn on the ends $10^a$ of the axle, and said sleeves are provided with loops or eyes $15^b$ through which the curved lower portions $14^a$ of the braces 14 pass, the extremities of said curved portions $14^a$ being bent up, as indicated at $14^b$, to form stops to limit the turning movement of the sleeves $15^a$ on the ends of the axle. By this construction it will be seen that the beams 15 carrying the cultivator-blades are adapted to be raised and lowered, the sleeves $15^a$ turning on the ends of the axle to permit this.

Springs 20 are attached to the upper end portions of the arched axle, and these springs are attached to links 21 connected with the forward ends of the main beams 15, the said springs permitting the teeth to be carried down into the ground a predetermined depth, at which time the springs will be placed under pressure, and when tension is released from the handles 19 the springs will return the main beams to the desired upper position.

The grain-box or hopper A is preferably made of such length that it will extend practically from one ground-wheel to the other, and the said grain-box is supported from the upper fore part of the arched axle 10 through the medium of forwardly-extending brackets 22 or their equivalents, and the bottom portion of the grain-box may rest in a measure upon the forward braces 14 of the cultivator. The box comprises a body 23, which is preferably provided with a flat bottom and inclined sides, whereby the box is somewhat V-shaped in cross-section, being widest at the top, and a cover 24 is ordinarily hinged to the body of the box.

An agitator B is held to revolve within the lower portion of the grain-box, and the said agitator preferably consists of any desired number of substantially triangular plates 25 connected by bars or rods 26, extending longitudinally within the box, the said triangular plates being secured upon a shaft 27, and the said shaft is journaled in the end portions of the box and extends beyond one end thereof a predetermined distance.

Any desired number of openings 28 are made in the bottom and preferably central portion of the grain-box, and a slide 29 is mounted upon the upper face of the bottom of the box, the said slide being provided with openings 30 capable of registering entirely or partially with the openings 28 in the box proper, as shown in Fig. 2.

The movement of the slide 29 is controlled by a shifting-lever 31, which lever is fulcrumed beneath the box and is connected with the slide ordinarily by passing a pin from the lever through a slot in the bottom of the box and to an engagement with the said slide, the pin being shown at 31ª in Fig. 1. The outer portion of the lever is supported and travels upon a stirrup 32, secured, preferably, to the rear face of the grain-box.

The amount of seed to the acre that is to be dropped may be regulated conveniently through the medium of a gage-plate 33, which has sliding movement on the outer face of the grain-box, as shown in Fig. 2, being held in desired position by an adjusting-screw 34 or the equivalent thereof, and when the lever has been manipulated to produce, for example, a partial registry of the openings in the slide with the openings in the bottom of the seed-box, the gage-plate is adjusted until it will engage with this lever, as shown in Fig. 2.

When the machine is turning corners or being carried from one place to another, the discharge of seed is entirely stopped by shifting the lever 31 so as to cause the slide 29 to cover all of the discharge-openings of the box, and when the planting-ground is again reached, or after the machine has been turned, the driver need only force the lever over until it strikes the gage-plate 33, being assured that the same amount of seed to the acre will be dropped as when the machine was first started.

The agitator is revolved preferably by placing upon the outer end of each shaft 27 a sprocket 35, connected by a link-belt 36 with a sprocket-wheel 37 secured to one of the ground-wheels of the machine, as is shown best in Figs. 2 and 3.

In the operation of this machine the seed will be dropped in front of the cultivator-teeth, and said seed will be covered by the teeth passing over them, and since the box is quite close to the ground there will be comparatively no waste of seed in windy weather, and practically in one operation the field may be planted with seed and the seed raked properly in the ground, and an ordinary cultivator may be expeditiously and conveniently converted into a planter.

Having thus described our invention, we claim as new and desire to secure by Letters Patent—

The combination of a wheeled frame having an axle provided with an arched central portion and horizontal end portions, sleeves arranged to turn on the horizontal end portions of the axle and provided with loops, braces extending diagonally rearward and downward from the forward part of the frame to the end portions of said axle and having their lower parts curved around said sleeves and passed through said eyes, the extremities of said curved end portions of the braces being bent to form stops to limit the turning movement of the sleeves on the ends of the axle, and beams carried on said sleeves and provided with cultivator-teeth, substantially as set forth.

WILLIAM R. FROST.
WILLIAM H. BUTLIN.

Witnesses:
O. H. SALTZGAVER,
G. W. RAINES.